(12) United States Patent
Hasegawa et al.

(10) Patent No.: US 10,640,852 B2
(45) Date of Patent: May 5, 2020

(54) ALUMINUM-ALLOY CLAD MATERIAL AND METHOD OF MANUFACTURING THE SAME

(71) Applicant: UACJ Corporation, Tokyo (JP)

(72) Inventors: Akifumi Hasegawa, Aichi (JP); Hiroki Tanaka, Aichi (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 15/938,827

(22) Filed: Mar. 28, 2018

(65) Prior Publication Data

US 2018/0282843 A1 Oct. 4, 2018

(30) Foreign Application Priority Data

Mar. 30, 2017 (JP) .................. 2017-068635

(51) Int. Cl.
| | | |
|---|---|---|
| C22C 21/14 | (2006.01) | |
| C22C 21/16 | (2006.01) | |
| C22C 21/18 | (2006.01) | |
| B32B 15/01 | (2006.01) | |
| C22C 21/00 | (2006.01) | |
| C22F 1/04 | (2006.01) | |

(52) U.S. Cl.
CPC ............ *C22C 21/14* (2013.01); *B32B 15/016* (2013.01); *C22C 21/00* (2013.01); *C22C 21/16* (2013.01); *C22C 21/18* (2013.01); *C22F 1/04* (2013.01); *Y10T 428/12764* (2015.01)

(58) Field of Classification Search
None
See application file for complete search history.

(56) References Cited

U.S. PATENT DOCUMENTS

| | | | |
|---|---|---|---|
| 3,807,033 | A | 4/1974 | Schoer et al. |
| 3,811,177 | A | 5/1974 | Schoer et al. |
| 3,853,547 | A | 12/1974 | Singleton |
| 3,900,151 | A | 8/1975 | Heinz et al. |
| 4,121,750 | A | 10/1978 | Schoer et al. |
| 4,173,302 | A | 11/1979 | Schultze et al. |
| 4,241,148 | A | 12/1980 | Schoer et al. |
| 4,626,295 | A | 12/1986 | Sasaki et al. |
| 4,645,119 | A | 2/1987 | Haramaki et al. |
| 4,905,887 | A | 3/1990 | Schoer et al. |
| 4,906,307 | A | 3/1990 | Fujiyoshi |
| 4,991,647 | A | 2/1991 | Kawabe et al. |
| 5,171,377 | A | 12/1992 | Shimizu et al. |
| 5,232,788 | A | 8/1993 | Timsit et al. |
| 5,316,206 | A | 5/1994 | Syslak et al. |
| 5,418,072 | A | 5/1995 | Baldantoni et al. |
| 5,450,666 | A | 9/1995 | Conn et al. |
| 6,113,667 | A | 9/2000 | Hyogo et al. |
| 6,234,243 | B1 | 5/2001 | Murching et al. |
| 6,277,219 | B1 | 8/2001 | Heinz et al. |
| 6,444,058 | B1 | 9/2002 | Liu et al. |
| 2001/0023721 | A1 | 9/2001 | Heinz et al. |
| 2001/0040180 | A1 | 11/2001 | Wittebrood et al. |
| 2002/0005230 | A1 | 1/2002 | Watsuji et al. |
| 2002/0012811 | A1 | 1/2002 | Wittebrood et al. |
| 2002/0031681 | A1 | 3/2002 | Heinz et al. |
| 2002/0037425 | A1 | 3/2002 | Mooij et al. |
| 2002/0079027 | A1 | 6/2002 | Liu et al. |
| 2002/0086179 | A1 | 7/2002 | Wittebrood |
| 2002/0102431 | A1 | 8/2002 | Wittebrood et al. |
| 2003/0051342 | A1 | 3/2003 | Hasegawa et al. |
| 2003/0070734 | A1 | 4/2003 | Heinz et al. |
| 2003/0084569 | A1 | 5/2003 | Hyogo et al. |
| 2003/0091856 | A1 | 5/2003 | Wittebrood |
| 2004/0009358 | A1 | 1/2004 | Scott et al. |
| 2004/0028940 | A1 | 2/2004 | Toyama et al. |
| 2004/0121180 | A1 | 6/2004 | Wittebrood et al. |
| 2004/0238605 | A1 | 12/2004 | Nishimura et al. |
| 2005/0006065 | A1 | 1/2005 | Katsumata et al. |
| 2005/0076506 | A1 | 4/2005 | Kanada |
| 2005/0189047 | A1 | 9/2005 | Hasegawa et al. |
| 2006/0000586 | A1 | 1/2006 | Katsumata et al. |
| 2006/0102691 | A1 | 5/2006 | Toyama et al. |

(Continued)

FOREIGN PATENT DOCUMENTS

| | | |
|---|---|---|
| CN | 1416377 A | 5/2003 |
| CN | 1886527 A | 12/2006 |

(Continued)

OTHER PUBLICATIONS

"Aluminum-Magnesium-Silicon (6000) Alloys", published May 2003, found at: http://www.totalmateria.com/Article74.htm.

Brazing of Stainless Steel to Aluminium for Pots and Pans Production, Oct. 2010, webpage found at: http://www.aluminium-brazing.com/2010/10/.

Elkem Bremanger, Result Analysis Report for Silgrain 10 micron dated Aug. 20, 2008.

J.R. Davis, "Aluminum and Aluminum Alloys", Pages from the third edition of ASM Specialty Handbook, ASM International, 1993.

(Continued)

Primary Examiner — Daniel J. Schleis

(74) Attorney, Agent, or Firm — J-Tek Law PLLC; Jeffrey D. Tekanic; Scott T. Wakeman

(57) ABSTRACT

An aluminum-alloy clad material includes a skin layer clad to and covering at least one surface of a core layer. The core layer is composed of an aluminum alloy containing Cu: 3.8-4.9 mass %, Mg: 1.2-1.8 mass % and Mn: 0.3-0.9 mass %. The core layer has an area number density of microvoids that have a circle-equivalent diameter of 0.5 μm or greater that is 100/mm² or less. The skin layer has an Al purity of 99.5 mass % or greater. A method of manufacturing a wrought material from such an aluminum-alloy clad material includes heating the wrought material to the solution heat treatment temperature of the core layer at a temperature-rise rate of 50° C.-200° C./h.

20 Claims, No Drawings

(56) References Cited

U.S. PATENT DOCUMENTS

| | | | |
|---|---|---|---|
| 2007/0017605 A1 | 1/2007 | Nakamura et al. |
| 2007/0158386 A1 | 7/2007 | Dulac et al. |
| 2007/0251091 A1 | 11/2007 | Minami et al. |
| 2008/0003451 A1 | 1/2008 | Suzuki et al. |
| 2008/0047683 A1 | 2/2008 | Takahashi |
| 2009/0165893 A1 | 7/2009 | Akazawa et al. |
| 2009/0233118 A1 | 9/2009 | Katoh et al. |
| 2010/0051247 A1 | 3/2010 | Sogabe et al. |
| 2010/0112370 A1 | 5/2010 | Ueda et al. |
| 2010/0116472 A1 | 5/2010 | Katsumata et al. |
| 2010/0266871 A1 | 10/2010 | Matsuo et al. |
| 2011/0114228 A1 | 5/2011 | Nakamura et al. |
| 2012/0145365 A1 | 6/2012 | Yamashita et al. |
| 2012/0177947 A1 | 7/2012 | Abrahamsson et al. |
| 2013/0118013 A1 | 5/2013 | Yamashita et al. |
| 2013/0299564 A1 | 11/2013 | Steiner et al. |
| 2013/0306714 A1 | 11/2013 | Wittebrood |
| 2014/0186560 A1 | 7/2014 | Katsumata et al. |
| 2015/0068713 A1 | 3/2015 | Sucke et al. |
| 2015/0118517 A1 | 4/2015 | Itoh et al. |
| 2015/0239071 A1 | 8/2015 | Kiga |
| 2015/0273635 A1 | 10/2015 | Kumagai et al. |
| 2016/0097607 A1 | 4/2016 | Katsumata et al. |
| 2016/0332209 A1 | 11/2016 | Yamashita et al. |
| 2017/0151637 A1 | 6/2017 | Ichikawa et al. |
| 2017/0205159 A1 | 7/2017 | Yamashita et al. |
| 2017/0205160 A1 | 7/2017 | Yanagawa et al. |
| 2017/0320170 A1 | 11/2017 | Yanagawa et al. |

FOREIGN PATENT DOCUMENTS

| | | |
|---|---|---|
| CN | 101871062 A | 10/2010 |
| CN | 102803891 A | 11/2012 |
| DE | 19744734 A1 | 4/1999 |
| DE | 102008009695 A1 | 9/2008 |
| DE | 202012003090 U1 | 4/2012 |
| EP | 0659519 A1 | 6/1995 |
| EP | 0847830 A2 | 6/1998 |
| EP | 1127653 A2 | 8/2001 |
| EP | 1287934 A1 | 3/2003 |
| EP | 1533070 A1 | 5/2005 |
| EP | 1679146 A1 | 7/2006 |
| EP | 2418042 A1 | 2/2012 |
| EP | 2447662 A1 | 5/2012 |
| EP | 2578344 A1 | 4/2013 |
| JP | S53131253 A | 11/1978 |
| JP | S6182992 A | 4/1986 |
| JP | 61293699 A | 12/1986 |
| JP | H01225736 A | 9/1989 |
| JP | H03124394 A | 5/1991 |
| JP | H03226396 A | 10/1991 |
| JP | H0525576 A | 2/1993 |
| JP | H07227695 A | 8/1995 |
| JP | H07303858 A | 11/1995 |
| JP | H0852565 A | 2/1996 |
| JP | H0985433 A | 3/1997 |
| JP | H1034375 A | 2/1998 |
| JP | H1034378 A | 2/1998 |
| JP | H1180870 A | 3/1999 |
| JP | H11183085 A | 7/1999 |
| JP | H11221696 A | 8/1999 |
| JP | H11285817 A | 10/1999 |
| JP | H11335764 A | 12/1999 |
| JP | H11347783 A | 12/1999 |
| JP | 2000063970 A | 2/2000 |
| JP | 2000167688 A | 6/2000 |
| JP | 2000202620 A | 7/2000 |
| JP | 2000202680 A | 7/2000 |
| JP | 2000225461 A | 8/2000 |
| JP | 3160099 B2 | 4/2001 |
| JP | 3212927 B2 | 9/2001 |
| JP | 2002079370 A | 3/2002 |
| JP | 2002508446 A | 3/2002 |
| JP | 2002161323 A | 6/2002 |
| JP | 2002267382 A | 9/2002 |
| JP | 2002533572 A | 10/2002 |
| JP | 200394165 A | 4/2003 |
| JP | 2003126986 A | 5/2003 |
| JP | 2004025297 A | 1/2004 |
| JP | 2004042086 A | 2/2004 |
| JP | 2004076057 A | 3/2004 |
| JP | 2004084060 A | 3/2004 |
| JP | 2004330233 A | 11/2004 |
| JP | 2005060790 A | 3/2005 |
| JP | 2005523163 A | 8/2005 |
| JP | 2005256166 A | 9/2005 |
| JP | 2006043735 A | 2/2006 |
| JP | 2006175500 A | 7/2006 |
| JP | 2006213934 A | 8/2006 |
| JP | 2006255755 A | 9/2006 |
| JP | 2006307292 A | 11/2006 |
| JP | 2006348372 A | 12/2006 |
| JP | 2007031730 A | 2/2007 |
| JP | 2007039753 A | 2/2007 |
| JP | 2007044713 A | 2/2007 |
| JP | 2007512143 A | 5/2007 |
| JP | 2007178062 A | 7/2007 |
| JP | 2007216283 A | 8/2007 |
| JP | 2007260733 A | 10/2007 |
| JP | 2008006480 A | 1/2008 |
| JP | 2008100283 A | 5/2008 |
| JP | 2008121108 A | 5/2008 |
| JP | 2008208416 A | 9/2008 |
| JP | 2008261025 A | 10/2008 |
| JP | 2009058139 A | 3/2009 |
| JP | 2009058167 A | 3/2009 |
| JP | 2009068083 A | 4/2009 |
| JP | 2009106947 A | 5/2009 |
| JP | 2009142870 A | 7/2009 |
| JP | 2009184017 A | 8/2009 |
| JP | 2010075965 A | 4/2010 |
| JP | 2010075966 A | 4/2010 |
| JP | 2010247209 A | 11/2010 |
| JP | 2010255014 A | 11/2010 |
| JP | 2011000614 A | 1/2011 |
| JP | 2011136358 A | 7/2011 |
| JP | 2011247459 A | 12/2011 |
| JP | 2012067994 A | 4/2012 |
| JP | 2013189659 A | 9/2013 |
| JP | 2013233552 A | 11/2013 |
| JP | 2014050861 A | 3/2014 |
| JP | 2014083570 A | 5/2014 |
| JP | 2014226704 A | 12/2014 |
| WO | 9931287 A1 | 6/1999 |
| WO | 0037702 A1 | 6/2000 |
| WO | WO0037702 * | 6/2000 |
| WO | 2010147170 A1 | 12/2010 |
| WO | 2011034496 A2 | 3/2011 |
| WO | 2012104147 A1 | 8/2012 |
| WO | 2016017716 A1 | 2/2016 |
| WO | 2016190199 A1 | 12/2016 |

OTHER PUBLICATIONS

Malvern White Paper entitled "A Basic Guide to Particle Characterization", 2015, webpage found at: http://www.malvern.com/en/support/resource-center/Whitepapers/WP120620BasicGuidePartChar.aspx.

Nocolok® Sil Flux fg brochure, 2015, webpage found at: http://www.aluminium-brazing.com/sponsor/nocolok/Files/PDFs/31360.pdf.

Unpublished U.S. Appl. No. 15/572,945.

Unpublished U.S. Appl. No. 15/747,609.

\* cited by examiner

ALUMINUM-ALLOY CLAD MATERIAL AND METHOD OF MANUFACTURING THE SAME

CROSS-REFERENCE

This application claims priority to Japanese patent application no. 2017-068635 filed on Mar. 30, 2017, the contents of which are fully incorporated herein by reference.

TECHNICAL FIELD

The present invention generally relates to an aluminum-alloy clad material and to a method of manufacturing the same.

BACKGROUND ART

Because Al—Cu—Mg (aluminum-copper-magnesium) alloy materials have comparatively high strength even among aluminum-alloy materials, they are used widely in structural elements in which high strength is required, such as, e.g., the outer skin of an aircraft. To increase corrosion resistance, a high-purity aluminum alloy, such as a 1000-series aluminum, is sometimes coated on the surface of this type of alloy material.

During flight of an aircraft, the difference between the plane's interior air pressure and the exterior air pressure changes frequently in accordance with changes in altitude. Owing to such fluctuations in the air-pressure differential, the load applied to the skin of the aircraft changes frequently. Because of this, there is a demand for the outer skin of an aircraft to possess not only excellent static strength, such as tensile strength, but also excellent fatigue characteristics.

To improve the fatigue characteristics of aluminum-alloy materials, alloys having various chemical compositions have been proposed in the past, e.g., in WO99/31287 (and its Japanese counterpart Japanese Laid-open Patent Publication 2002-508446) and in WO00/37702 (and its Japanese counterpart Japanese Laid-open Patent Publication 2002-533572).

SUMMARY

To further improve safety, durability (service life), etc. of airplanes as well as to reduce fuel consumption, there is always a demand for aluminum-alloy materials having both excellent static strength and excellent fatigue characteristics. However, there has been a limit to the extent that static strength can be increased and fatigue characteristics can be improved merely by adjusting the chemical composition.

It is an object of the present teachings to provide an aluminum-alloy clad material having excellent static strength and excellent fatigue characteristics, and a method of manufacturing the same.

In a first aspect of the present teachings, an aluminum-alloy clad material preferably comprises: a core material having a chemical composition containing Cu (copper): 3.8-4.9 mass %, Mg (magnesium): 1.2~1.8 mass % and Mn (manganese): 0.3-0.9 mass %, the remainder containing Al (aluminum) and unavoidable impurities, and in which the number density of microvoids having a circle-equivalent diameter of 0.5 µm or greater is $100/mm^2$ or less; and a skin material in which the Al purity is 99.5 mass % or greater and that covers the surface of the core material.

The above-described aluminum-alloy clad material (hereinbelow, simply called the "clad material") includes a core material having the above-mentioned aluminum alloy composition and the number density of microvoids in the core material is in the above-specified range. By setting the chemical composition of the core material to the above-specified ranges, the clad material exhibits a static strength that is equivalent to or greater than that of existing Al—Cu—Mg alloy materials.

In addition, by setting the chemical composition of the core material to the above-specified ranges and, moreover, by setting the number density of microvoids in the core material to the above-specified range, it is furthermore possible to inhibit the formation of cracks (where the microvoids act as crack starting points) and to inhibit the growth of cracks (where the microvoids act as parts of the crack propagation paths). As a result, the fatigue characteristics of the clad material can be improved so as to exceed those of existing clad materials.

In addition, the surface of the clad material is covered by the skin material, in which the Al purity is 99.5 mass % or greater. For this reason, the clad material exhibits excellent corrosion resistance.

As described above, clad materials according to the present teachings exhibit excellent static strength, excellent fatigue characteristics, and excellent corrosion resistance. For this reason, clad materials according to present teachings can be suitably utilized in various applications, such as, e.g., the outer skin of an aircraft and the lower-surface skin of the main wings of an aircraft.

DETAILED DESCRIPTION OF THE EMBODIMENTS

The reasons for the range limits on the chemical compositions (elements) of the core material and the skin material in the above-described clad material will now be explained.
Core Material (Core Layer)
Cu (copper): 3.8-4.9 mass %

Cu precipitates particles of Cu-containing intermetallic compounds, such as Al—Cu intermetallic compounds and Al—Cu—Mg intermetallic compounds, and functions (acts) to increase the strength of the core material by precipitation strengthening. In addition, some of the Cu forms a solid solution in the core material (core layer) and functions to increase the strength of the core material by solid solution strengthening.

By setting the Cu content to (in) the above-specified range, the strength of the core material can be increased and, in turn, the strength of the clad material can be increased. If the Cu content is less than 3.8 mass %, then the effect of strengthening by the Cu will become insufficient, which will lead to a decrease in the strength of the clad material. If the Cu content is greater than 4.9 mass %, then there is a risk that the amount of precipitated particles in the clad material will increase.

If the amount of precipitated particles becomes excessively large, then there is a risk that this will lead to the formation of cracks, with the precipitated particles acting as crack starting points, and the growth of the cracks, in which the interfaces between the particles and the matrix act as parts of the crack propagation paths. In addition, in this case, there is a risk that microvoids will be formed at the interfaces between the particles and the matrix and at locations at which the particles have been destroyed by working of the material. Consequently, the number density of these microvoids will increase. For this reason, if the Cu content is greater than 4.9 mass %, then there is a risk that the fatigue characteristics of the clad material will degrade owing to the growth of cracks, the increase in microvoid number density, etc. as described above.

Mg (magnesium): 1.2-1.8 mass %

Mg precipitates particles of Mg-containing intermetallic compounds, such as Al—Cu—Mg intermetallic compounds, and thereby functions (acts) to increase the strength of the core material by precipitation strengthening. In addition, some of the Mg forms a solid solution in the core material and thereby functions to increase the strength of the core material by solid solution strengthening.

By setting the Mg content to (in) the above-specified range, the strength of the core material can be increased and, in turn, the strength of the clad material can be increased. If the Mg content is less than 1.2 mass %, then the effect of strengthening by the Mg will become insufficient, which will lead to a decrease in the strength of the clad material. If the Mg content is greater than 1.8 mass %, then there is a risk that the amount of precipitated particles in the clad material will become excessively great, leading to an even greater degradation of the fatigue characteristics of the clad material.

More specifically, if the amount of precipitated particles of Mg-containing intermetallic compounds becomes excessively large, then there is a risk that this will lead to the formation of cracks, with the precipitated particles acting as crack starting points, and the growth of the cracks, in which the interfaces between the particles and the matrix act as parts of the crack propagation paths. In addition, in this case, there is a risk that microvoids will be formed at the interfaces between the particles and the matrix and at locations at which the particles have been destroyed by working of the material. As a result, there is a risk of the fatigue characteristics of the clad material.

Mn (manganese): 0.3-0.9 mass %

Mn precipitates particles of Mn-containing intermetallic compounds, such as Al—Mn intermetallic compounds, and thereby functions (acts) to increase the strength of the core material by precipitation strengthening. In addition, some of the Mn forms a solid solution in the core material and thereby functions to increase the strength of the core material by solid solution strengthening.

By setting the Mn content to (in) the above-specified range, the strength of the core material can be increased and, in turn, the strength of the clad material can be increased. If the Mn content is less than 0.3 mass %, then the effect of strengthening by the Mn will become insufficient, which will lead to a decrease in the strength of the clad material. If the Mn content is greater than 0.9 mass %, then there is a risk that the amount of precipitated particles in the clad material will become excessively great, leading to an even greater degradation of the fatigue characteristics of the clad material.

More specifically, if the amount of precipitated particles of Mn-containing intermetallic compounds becomes excessively large, then there is a risk that this will lead to the formation of cracks, with the precipitated particles acting as crack starting points, and the growth of the cracks, in which the interfaces between the particles and the matrix act as parts of the crack propagation paths. In addition, in this case, there is a risk that microvoids will be formed at the interfaces between the particles and the matrix and at locations at which the particles have been destroyed by working of the material. As a result, there is a risk of the fatigue characteristics of the clad material.

Si (silicon): 0.020-0.20 mass %, Fe (iron): 0.020-0.20 mass %

The core material may further contain Si: 0.020-0.20 mass % and Fe: 0.020-0.20 mass %. If Si and Fe coexist, then particles of Al—Fe—Si intermetallic compounds can be formed during casting of the core material. Furthermore, in the core-material manufacturing process, particles of intermetallic compounds containing Cu, Mg, or the like can be precipitated, in which these particles act as the precipitation sites.

By setting the amount of Si to 0.020 mass % or greater and the amount of Fe to 0.020 mass % or greater in the core material, particles of Al—Fe—Si intermetallic compounds can be suitably formed in the core material. Thereby, in the subsequent core-material manufacturing process, minute particles of intermetallic compounds containing Cu, Mg, or the like can be precipitated. Furthermore, by making the particles of intermetallic compounds containing Cu, Mg, or the like minute (fine), microvoids can be inhibited from forming owing to melting of these particles during solution heat treatment. As a result, the fatigue characteristics of the clad material can be further improved.

If the amount of Si or the amount of Fe is excessively large, then the quantity of particles of the Al—Fe—Si intermetallic compounds in the core material will become excessively large, and there is a risk that this will lead to the formation of cracks, with the particles acting as crack starting points, and the growth of cracks, in which the interfaces between the particles and the matrix act as parts of the crack propagation paths, etc. By setting the amount of Si to 0.20 mass % or less and the amount of Fe to 0.20 mass % or less in the core material, such problems can be avoided and the fatigue characteristics of the clad material can be further improved.

Ti (titanium): 0.01-0.15 mass %

In addition, the core material may further contain Ti: 0.01-0.15 mass %. Ti functions (acts) to miniaturize the crystal grains of the core material (makes the grains fine). By setting the Ti content to (in) the above-specified range, the static strength of the core material can be further increased.

Other Elements

In addition, the core material may further contain other alloying elements, such as (without limitation) Cr (chrome) and Zn (zinc). However, if the content of these elements is excessively large, precipitates containing these elements will form in large quantities in the core material, whereby the fatigue characteristics of the clad material may be impaired. By setting the amount of Cr to 0.1 mass % or less and the amount of Zn to 0.3 mass % or less, such problems can be avoided.

Microvoid Number Density: 100/mm$^2$ or fewer

The number density of microvoids present in the core material and having a circle-equivalent diameter of 0.5 μm or greater is 100/mm$^2$ or fewer. By setting the number density of the microvoids in the core material to (in) the above-specified range, the fatigue characteristics of the clad material can be improved. It is noted that, in a core material having a chemical composition having the above-specified ranges, it is generally difficult to reduce the number density of microvoids having a circle-equivalent diameter of 0.5 μm or greater to 20/mm$^2$ or less.

It is further noted that, although the term "number density" is used throughout the specification and claims, "areal number density" or "area number density" is meant, because the number of microvoids is measured in a two-dimensional surface area, as indicated by the use of mm$^2$ (surface area), rather than mm$^3$, which indicates volume.

Skin Material (Skin Layer)

Al purity: 99.5 mass % or greater

The surface of the core material is covered with a skin material (skin layer) having an Al purity of 99.5 mass % or greater. By setting the Al purity of the skin material to 99.5 mass % or greater, the corrosion resistance of the clad material can be increased.

The clad material can be manufactured, for example, by the method described below. First, an ingot of the core material having the above-specified chemical composition is manufactured by a well-known method, such as a continuous-casting method or a semicontinuous-casting method. At this time, the amount of hydrogen contained in the ingot is preferably set to less than 0.20 ml per 100 g of the core material. By setting the amount of the hydrogen contained in the ingot to (in) the above-specified range, microvoids can be inhibited from forming during the solution heat treatment. As a result, the number density of microvoids in the core material can be further reduced.

An ingot of the skin material having the above-specified chemical composition is manufactured, separately from the ingot of the core material. Then, a laminated material of the core material and the skin material is manufactured by clad bonding the ingot of the core material to the ingot of the skin material.

Next, the laminated material is subjected to a homogenization treatment by heating it at a temperature of 495° C.-500° C. for 1 h or more. By performing the homogenization treatment under the conditions of the above-specified range, it is possible to avoid a deterioration of the productivity of the clad plate and it is possible to sufficiently form a solid solution, in the core material, of second-phase particles formed during the casting. As a result, the number density of the microvoids in the ultimately-obtained clad plate can be reduced.

If the heating temperature during the homogenization treatment is lower than 495° C., then the heating time needed to form a solid solution of the second-phase particles in the core material will lengthen, leading to a deterioration of the productivity of the clad material. On the other hand, if the heating temperature during the homogenization treatment is higher than 500° C., then there is a risk that the core material will partially melt, which is not preferable.

If the heating time of the homogenization treatment is less than 1 h, then there is a risk of an insufficient formation of a solid solution of the second-phase particles in the core material. In this case, microvoids will tend to form, with the second-phase particles acting as the starting points, and there is a risk that this will lead to an increase in the microvoid number density. In order to adequately form a solid solution of the second-phase particles, it is preferable to lengthen the heating time; however, if the heating time becomes excessively long, then it will lead to a deterioration of the productivity of the clad material. Therefore, to avoid a deterioration of the productivity of the clad material, it is preferable to set the heating time of the homogenization treatment to 10 h or less.

After the homogenization treatment, the laminated material is hot worked, and a wrought material is thereby manufactured. At this time, it is preferable to further cold work the laminated material as needed. The wrought material is then subjected to a solution heat treatment by heating the wrought material to a temperature that is equal to or higher than the solution heat treatment temperature of the core material—under the conditions in which the temperature-rise rate is 50° C.-200° C./h from after the wrought material reaches 100° C. until it reaches the solution heat treatment temperature of the core material.

By setting the heating conditions during the solution heat treatment to the above-specified ranges, it is possible to inhibit the formation of particles of Al—Cu intermetallic compounds present in the core material and the formation of microvoids owing to melting of the particles of Al—Cu—Mg intermetallic compounds and, while doing so, to form a solid solution, in the core material, of the second-phase particles containing these particles. Furthermore, by rapidly cooling the wrought material, e.g., using a method such as water cooling, immediately after heating has completed, the core material can be made into a so-called supersaturated solid solution.

Although the solution heat treatment temperature range of the core material varies with the chemical composition of the core material, the solution heat treatment temperature can generally be set to a range of 480° C.-490° C. for a core material having a chemical composition according to the above-specified ranges. In addition, in the solution heat treatment, the solution heat treatment temperature is held after the temperature of the core material has reached the solution heat treatment temperature, and thereby the second-phase particles can form a solid solution in the core material more reliably. The hold time of the solution heat treatment temperature can be set, as appropriate, in the range of, for example, 30-120 min.

If the temperature-rise rate during the solution heat treatment is less than 50° C./h, then the treatment time of the solution treatment becomes long, leading to a deterioration of the productivity of the clad material. If the temperature-rise rate is greater than 200° C./h, then there is a risk that microvoids will be formed owing to melting of the particles of the Al—Cu intermetallic compounds, the particles of the Al—Cu—Mg intermetallic compounds, etc.

By appropriately combining aging treatment, cold working, etc. as needed after the solution heat treatment has been performed in this manner, the precipitation state of the Al—Cu intermetallic compound particles etc. can be adjusted, and thereby a clad material having the desired characteristics can be obtained.

Working Examples

Working examples of the aluminum-alloy clad material and methods of manufacturing the same will now be explained. It is noted that the specific embodiments of the clad material and the methods of manufacturing the same according to the present teachings are not limited to the working examples below, and it is understood that variations and modifications thereof may be effected without departing from the spirit and scope of the invention.

In the present example, first, slabs of the core material were manufactured, by DC casting, from melts of aluminum alloys having the various chemical compositions (alloy symbols A-H) shown in Table 1. The amounts of hydrogen contained per 100 g of these core materials were as shown in Table 1.

In addition, separately from the slabs of the core materials, slabs of skin materials were manufactured, by DC casting, from a melt of high-purity aluminum in which the Al purity was 99.5 mass % or greater. The slabs of the skin materials were disposed on both sides of the slabs of the core materials in accordance with the combinations shown in Table 2, after which these slabs were joined by clad bonding, and thereby the laminated materials, in which both sides of the core materials were covered with the skin materials, were manufactured. These laminated materials underwent homogenization treatments by being heated for the heating times at the heating temperatures shown in Table 2.

After the homogenization treatments, the laminated materials were hot rolled, and thereby wrought materials having the sheet thicknesses shown in Table 2 were manufactured. Subsequently, under the conditions in which the values shown in Table 2 were the temperature-rise rates from after the temperature of 100° C. was reached until the temperature of 490° C. was reached, the wrought materials were heated and, after the temperatures of the wrought materials reached 490° C., this temperature was held for 1 h. Furthermore, immediately after the heating of the wrought materials was completed, the wrought materials were water cooled, and thereby the solution heat treatments were completed.

The tensile strength, the microvoid number density, and the fatigue-crack growth rate of the clad materials (test materials 1-10 in Table 2) obtained based on the above were evaluated using the methods below.

Tensile Strength

No. 5 test pieces, as stipulated in JIS Z2241, were collected from the test materials such that the longitudinal direction and the rolling direction were parallel. Tension tests were performed on these test pieces using a method in accordance with the methods stipulated in JIS Z2241. The tensile strength values of the test materials calculated based on the results of the tension tests are as shown in Table 2.

In the evaluation of tensile strength, static strength was deemed to be excellent for the test pieces in which the tensile strength was 430 MPa or greater, and these were judged to be acceptable. On the other hand, static strength was deemed to be poor for the test pieces in which the tensile strength was less than 430 MPa, and these were judged to be unacceptable.

Microvoid Number Density

A cross section (LT-ST plane) perpendicular to the rolling direction of each test material was exposed, and the cross section was observed using an SEM (a scanning electron microscope). Multiple SEM images were acquired by random selection of observation positions such that the total surface area of the visual field was 1 mm$^2$ or greater. The number of microvoids present in these SEM images and having a circle-equivalent diameter of 0.5 μm or greater was converted to the number of microvoids per 1 mm$^2$ of surface area, and the microvoid number density was calculated thereby. The microvoid number density for each test material was as shown in Table 2.

Fatigue-Crack Growth Rate

Using a method in accordance with the methods stipulated in ASTM E647-15e1, a fatigue-crack growth test was performed on each test material. Specifically, CT test pieces were collected from a center part of a plane (LT-ST plane) perpendicular to the rolling direction of the test material such that the stress-loading direction was oriented in the sheet-width direction (LT direction) of the test material and the crack-growth direction was parallel to the rolling direction (L direction) of the sheet material. Furthermore, the fatigue-crack growth test was performed on these CT test pieces by controlling the load such that the stress ratio R was 0.1 and the stress-intensity factor ΔK was in the range of 32-34 MPa·m$^{1/2}$. The fatigue-crack growth rate of each test material calculated based on the results of the fatigue-crack growth test was as shown in Table 2.

In the evaluation of the fatigue-crack growth rate, crack growth due to fatigue was sufficiently reduced and excellent fatigue characteristics were obtained for the test pieces in which the fatigue-crack growth rate was less than 0.0025 mm/cycle, and these were judged to be acceptable. On the other hand, the fatigue characteristics were deemed to be poor for the test pieces in which the fatigue-crack growth rate was 0.0025 mm/cycle or greater, and these were judged to be unacceptable.

TABLE 1

| Alloy Symbol | Chemical Composition (mass %) | | | | | | | | | Hydrogen Content (ml/100 g) |
|---|---|---|---|---|---|---|---|---|---|---|
| | Si | Mg | Fe | Cu | Mn | Cr | Zn | Ti | Al | |
| A | 0.17 | 1.24 | 0.08 | 4.51 | 0.57 | 0.02 | 0.20 | 0.03 | Bal. | 0.14 |
| B | 0.11 | 1.74 | 0.06 | 4.82 | 0.46 | 0.05 | 0.14 | 0.02 | Bal. | 0.11 |
| C | 0.07 | 1.62 | 0.06 | 4.24 | 0.47 | 0.06 | 0.04 | 0.03 | Bal. | 0.09 |
| D | 0.06 | 1.53 | 0.11 | 4.77 | 0.42 | 0.05 | 0.08 | 0.02 | Bal. | 0.16 |
| E | 0.09 | 2.10 | 0.13 | 5.27 | 0.69 | 0.04 | 0.07 | 0.03 | Bal. | 0.18 |
| F | 0.08 | 1.07 | 0.09 | 3.74 | 0.46 | 0.02 | 0.22 | 0.02 | Bal. | 0.09 |
| G | 0.51 | 1.61 | 0.38 | 4.44 | 0.38 | 0.02 | 0.11 | 0.02 | Bal. | 0.09 |
| H | 0.11 | 1.55 | 0.08 | 4.63 | 0.51 | 0.02 | 0.12 | 0.03 | Bal. | 0.36 |

TABLE 2

| Test Piece Symbol | Alloy Symbol of Core | Al Purity of Skin Material (mass %) | Homogenization Treatment | | Solution Heat Treatment Temperature-Rise Rate (° C./h) | Clad Material | | | |
|---|---|---|---|---|---|---|---|---|---|
| | | | Heating Temperature (° C.) | Heating Time (h) | | Sheet Thickness (mm) | Tensile Strength (MPa) | Number Density of Microvoids (per mm$^2$) | Fatigue-Crack Growth Rate (mm/cycle) |
| 1 | A | 99.87 | 495 | 5 | 134 | 4.91 | 447 | 57.21 | 0.00226 |
| 2 | B | 99.68 | 496 | 5 | 133 | 4.88 | 448 | 25.01 | 0.00193 |
| 3 | C | 99.66 | 496 | 8 | 182 | 4.94 | 451 | 61.32 | 0.00209 |
| 4 | D | 99.81 | 495 | 10 | 167 | 4.97 | 449 | 22.14 | 0.00212 |
| 5 | E | 99.65 | 495 | 5 | 122 | 4.99 | 454 | 201.79 | 0.00286 |

TABLE 2-continued

| Test Piece Symbol | Alloy Symbol of Core | Al Purity of Skin Material (mass %) | Homogenization Treatment | | Solution Heat Treatment Temperature-Rise Rate (° C./h) | Clad Material | | | |
|---|---|---|---|---|---|---|---|---|---|
| | | | Heating Temperature (° C.) | Heating Time (h) | | Sheet Thickness (mm) | Tensile Strength (MPa) | Number Density of Microvoids (per mm$^2$) | Fatigue-Crack Growth Rate (mm/cycle) |
| 6 | F | 99.82 | 497 | 6 | 156 | 4.97 | 425 | 41.46 | 0.00217 |
| 7 | G | 99.88 | 497 | 10 | 155 | 4.88 | 442 | 74.41 | 0.00316 |
| 8 | H | 99.84 | 497 | 3 | 147 | 4.91 | 455 | 154.78 | 0.00384 |
| 9 | A | 99.87 | 485 | 10 | 140 | 4.92 | 451 | 153.55 | 0.00347 |
| 10 | A | 99.68 | 496 | 5 | 251 | 4.93 | 449 | 195.52 | 0.00317 |

As shown in Table 1 and Table 2, the chemical compositions of the core materials of test materials 1-4 were within the above-specified ranges, and the numbers of microvoids having a circle-equivalent diameter of 0.5 μm or greater were 100/mm$^2$ or fewer. Consequently, these test materials exhibited excellent static strength and excellent fatigue characteristics.

In test material 5, the amount of Cu and the amount of Mg in the core material were both greater than the above-specified ranges, which led to an undesirable increase in microvoid number density. As a result, test material 5 exhibited poor fatigue characteristics.

In test material 6, the amount of Cu and the amount of Mg in the core material were both less than the above-specified ranges, and consequently the effect of strengthening by the Cu, the Mg, etc. became insufficient. As a result, test material 6 exhibited poor static strength.

In test material 7, the amount of Si and the amount of Fe in the core material were both greater than the above-specified ranges, and consequently the quantity of particles of the Al—Fe—Si intermetallic compounds in the core material was excessively large. As a result, test material 7 exhibited poor fatigue characteristics.

In test material 8, the amount of hydrogen in the core material during casting was greater than the above-specified range, which led to an undesirable increase in the microvoid number density. As a result, test material 8 exhibited poor fatigue characteristics.

In test material 9, the heating temperature during the homogenization treatment was less than the above-specified range, which led to an insufficient formation of the solid solution of the second-phase particles in the core material as well as to an undesirable increase in the microvoid number density. As a result, test material 9 exhibited poor fatigue characteristics.

In test material 10, the temperature-rise rate during the solution heat treatment was higher than the above-specified range, which led to melting of the particles of the Al—Cu intermetallic compounds and the particles of the Al—Cu—Mg intermetallic compounds during the solution heat treatment as well as to an undesirable increase in the microvoid number density. As a result, test material 10 exhibited poor fatigue strength.

Representative, non-limiting examples of the present invention were described above in detail. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings to provide improved aluminum-alloy clad materials and methods of manufacturing the same.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional embodiments of the present teachings include, but are not limited to:

1. An aluminum-alloy clad material comprising:
    a core material having a chemical composition containing Cu: 3.8-4.9 mass % and Mg: 1.2-1.8 mass %, the remainder being composed of Al and unavoidable impurities, and in which the number density of microvoids having a circle-equivalent diameter of 0.5 μm or more is 100/mm$^2$ or less; and
    a skin material in which Al purity is 99.5 mass % or more and that covers the surface of the core material.

2. The aluminum-alloy clad material according to the above embodiment 1, wherein the core material further contains Si: 0.020-0.20 mass % and Fe: 0.020-0.20 mass %.

3. A method of manufacturing the aluminum-alloy clad material according to the above embodiment 1 or 2, wherein:
    an ingot of the core material and an ingot of the skin material are prepared;
    a laminated material is manufactured by clad bonding the ingot of the core material and the ingot of the skin material;
    the laminated material undergoes a homogenization treatment by heating the laminated material at a temperature of 495° C.-500° C. for 1 h or more;
    a wrought material is manufactured by hot working the laminated material; and a solution heat treatment is performed by heating the wrought material to a temperature of the solution heat treatment temperature or higher under conditions in which a temperature-rise rate from after the wrought material reaches 100° C. until the wrought material reaches the solution heat treatment temperature of the core material is 50° C.-200° C./h.

4. The aluminum-alloy-clad-material manufacturing method according to the above embodiment 3, wherein the amount of hydrogen contained in the ingot of the core material is less than 0.2 ml per 100 g of the core material.

We claim:

1. An aluminum-alloy clad material comprising:
a skin layer clad to and covering at least one surface of a core layer,
wherein the core layer is composed of an aluminum alloy containing Cu: 3.8-4.9 mass %, Mg: 1.2-1.8 mass % and Mn: 0.3-0.9 mass %,
the core layer has an area number density of microvoids that have a circle-equivalent diameter of 0.5 μm or greater that is 100/mm² or less, and
the skin layer has an Al purity of 99.5 mass % or greater.

2. The aluminum-alloy clad material according to claim 1, wherein the core layer further contains Si: 0.020-0.20 mass % and Fe: 0.020-0.20 mass %.

3. The aluminum-alloy clad material according to claim 2, wherein the core layer contains Mn: 0.42-0.57 mass %.

4. The aluminum-alloy clad material according to claim 3, wherein the core layer further contains Cr: 0.02-0.06 mass %.

5. The aluminum-alloy clad material according to claim 4, wherein the core layer further contains Zn: 0.04-0.20 mass %.

6. The aluminum-alloy clad material according to claim 5, wherein the core layer further contains Ti: 0.01-0.15 mass %.

7. The aluminum-alloy clad material according to claim 1, wherein the core layer consists of Cu: 3.8-4.9 mass %, Mg: 1.2-1.8 mass %, Fe: 0.020-0.20 mass %, Si: 0.020-0.20 mass %, Mn: 0.42-0.57 mass %, Cr: 0.02-0.06 mass %, Zn: 0.04-0.20 mass %, and Ti: 0.01-0.15 mass %, the remainder being Al and unavoidable impurities.

8. The aluminum-alloy clad material according to claim 7, wherein the area number density of microvoids that have a circle-equivalent diameter of 0.5 μm or greater that is 65/mm² or less.

9. The aluminum-alloy clad material according to claim 1, produced by a process comprising:
preparing an ingot of the core layer;
preparing an ingot of the skin layer;
clad bonding the ingot of the core layer to the ingot of the skin layer to form a laminated material;
subjecting the laminated material to a homogenization treatment by heating the laminated material at a temperature of 495° C.-500° C. for 1 h or more;
hot working the laminated material to form a wrought material; and
subjecting the wrought material to a solution heat treatment by heating the wrought material to a solution heat treatment temperature of the core material or higher with the proviso that, after the wrought material reaches 100° C. until the wrought material reaches the solution heat treatment temperature of the core material, the wrought material is heated at a temperature-rise rate of 50° C.-200° C./h, whereby the aluminum-alloy clad material according to claim 1 is formed.

10. The aluminum-alloy clad material according to claim 9, wherein prior to performing the solution heat treatment, the ingot of the core layer contains less than 0.2 ml of hydrogen per 100 g of the core layer.

11. The aluminum-alloy clad material according to claim 10, wherein the solution heat treatment temperature is 480° C.-490° C.

12. The aluminum-alloy clad material according to claim 11, wherein the solution heat treatment time is 30-120 minutes.

13. The aluminum-alloy clad material according to claim 12, wherein the temperature-rise rate during the solution heat treatment is 130° C.-185° C./h.

14. The aluminum-alloy clad material according to claim 13, wherein prior to performing the solution heat treatment, the ingot of the core layer contains 0.09-0.16 ml of hydrogen per 100 g of the core layer.

15. The aluminum-alloy clad material according to claim 14, wherein the core layer further contains Fe: 0.020-0.20 mass % and Si: 0.020-0.20 mass %.

16. The aluminum-alloy clad material according to claim 15, wherein the core layer contains Mn: 0.42-0.57 mass %, and further contains Cr: 0.02-0.06 mass %, Zn: 0.04-0.20 mass % and Ti: 0.01-0.15 mass %.

17. The aluminum-alloy clad material according to claim 14, wherein the core layer consists of Cu: 3.8-4.9 mass %, Mg: 1.2-1.8 mass %, Fe: 0.020-0.20 mass %, Si: 0.020-0.20 mass %, Mn: 0.42-0.57 mass %, Cr: 0.02-0.06 mass %, Zn: 0.04-0.20 mass %, and Ti: 0.01-0.15 mass %, the remainder being Al and unavoidable impurities.

18. An aluminum-alloy clad material comprising:
a skin layer clad to and covering at least one surface of a core layer,
wherein the core layer is composed of an aluminum alloy containing Cu: 3.8-4.9 mass % and Mg: 1.2-1.8 mass %,
the core layer has an area number density of microvoids that have a circle-equivalent diameter of 0.5 μm or greater that is 100/mm² or less, and
the skin layer has an Al purity of 99.5 mass % or greater.

19. The aluminum-alloy clad material according to claim 18, wherein the core layer further contains Mn: 0.3-0.9 mass %, Cr: 0.1 mass % or less and Zn: 0.3 mass % or less.

20. The aluminum-alloy clad material according to claim 18, produced by a process comprising:
preparing an ingot of the core layer;
preparing an ingot of the skin layer;
clad bonding the ingot of the core layer to the ingot of the skin layer to form a laminated material;
subjecting the laminated material to a homogenization treatment by heating the laminated material at a temperature of 495° C.-500° C. for 1 h or more;
hot working the laminated material to form a wrought material; and
subjecting the wrought material to a solution heat treatment by heating the wrought material to a solution heat treatment temperature of the core material or higher with the proviso that, after the wrought material reaches 100° C. until the wrought material reaches the solution heat treatment temperature of the core material, the wrought material is heated at a temperature-rise rate of 50° C.-200° C./h, whereby the aluminum-alloy clad material according to claim 18 is formed.

* * * * *